United States Patent [19]

Song

[11] Patent Number: 5,800,331
[45] Date of Patent: Sep. 1, 1998

[54] IMBALANCE DETECTION AND ROTOR IDENTIFICATION SYSTEM

[76] Inventor: Jin Y. Song, 12790 Idlewood La., Saratoga, Calif. 95070

[21] Appl. No.: 941,696

[22] Filed: Oct. 1, 1997

[51] Int. Cl.⁶ .................. B04B 13/00; G01M 1/22
[52] U.S. Cl. .................. 494/7; 494/10; 494/37; 73/462
[58] Field of Search .................. 494/1, 7, 9, 10, 494/11, 12, 16, 20, 37, 82, 84, 85; 210/85, 144, 767, 781; 73/66, 457, 460, 462; 324/160, 162, 164

[56] References Cited

U.S. PATENT DOCUMENTS

| | | |
|---|---|---|
| 2,895,023 | 7/1959 | Blum .................. 494/7 X |
| 3,101,322 | 8/1963 | Stallman et al. .................. 494/9 |
| 4,060,716 | 11/1977 | Pekrul et al. . |
| 4,096,988 | 6/1978 | Scuricini .................. 494/7 |
| 4,214,179 | 7/1980 | Jacobson et al. .................. 494/7 X |
| 4,491,019 | 1/1985 | Wicki et al. .................. 73/462 X |
| 4,551,715 | 11/1985 | Durbin .................. 494/9 X |
| 4,601,696 | 7/1986 | Kamm .................. 494/10 |
| 4,700,117 | 10/1987 | Giebeler et al. .................. 494/7 X |
| 4,827,197 | 5/1989 | Giebeler .................. 494/9 X |
| 4,857,811 | 8/1989 | Barrett et al. .................. 494/10 X |
| 5,037,371 | 8/1991 | Romanauskas .................. 494/10 |
| 5,160,876 | 11/1992 | Niinai et al. .................. 494/7 X |
| 5,235,864 | 8/1993 | Rosselli et al. .................. 494/10 X |
| 5,383,838 | 1/1995 | Cheng et al. .................. 494/7 X |
| 5,496,254 | 3/1996 | Keller et al. .................. 494/7 |
| 5,509,881 | 4/1996 | Sharples .................. 494/7 |
| 5,646,340 | 7/1997 | Gee et al. . |
| 5,649,893 | 7/1997 | Inaniwa et al. .................. 494/9 |

*Primary Examiner*—Charles E. Cooley
*Attorney, Agent, or Firm*—John J. Leavitt; George M. Cooper

[57] ABSTRACT

Apparatus and a method for detecting imbalance and for identifying rotors in centrifuges is disclosed. An accelerometer measures the vibration of a rotating drive system as it accelerates from rest to a predetermined speed, and a signal processing system monitors changes in the magnitude of measured vibration energy. The processing system determines the power spectrum density of the measured values and from this the frequency spectrum and the total energy spectrum of the measured vibration are determined. These values may be used to provide an identifying profile which can be used as a reference for later identification of drive systems and rotors in operating systems, and for monitoring and controlling such operating systems.

9 Claims, 9 Drawing Sheets

IMBALANCE DETECTION AND ROTOR IDENTIFICATION SYSTEM

BACKGROUND OF THE INVENTION

1. Field of the Invention

The present invention relates, in general, to a system for preventing the unsafe operation of a centrifuge resulting from excessive imbalance conditions and/or excessive centrifugal forces on the load, and more particularly to an imbalance detection and rotor identification system utilizing the power spectrum density characteristics of the centrifuge drive system's rotational dynamics during acceleration under varying load conditions.

2. Description of the Prior Art

Centifuges are well known systems for use in separating a biological or chemical sample into its components. In such systems, a sample is supported in a container secured within a centrifuge rotor that is driven at a velocity sufficient to cause the sample components to separate according to their molecular weight. The drive system in a high performance centrifuge is capable of spinning various samples at extremely high speeds to produce large centrifugal forces in the system. If the centrifugal force becomes excessive because the load is too large, or is unbalanced, dynamic stresses can be imposed on the drive system which can cause a catastrophic failure of the centrifuge. Such failures can be extremely dangerous to the centrifuge operator, and accordingly, one of the objects of centrifuge design in accordance with the invention disclosed herein, is to identify the specific rotor system and prevent the unsafe situations which result from excessive imbalance conditions and/or excessive centifugal forces on the sample.

The load on a centrifuge system includes the rotor, its drive motor and drive shaft, and the sample which the rotor carries. The rotor is designed to meet a performance criterion which is established by the desired applications for the device, as determined by the user. Some such applications require high speed from the centrifuge while others emphasize a high sample volume. The high volume rotors typically are designed for speeds of 6,000 to 10,000 rpm, and usually are provided with large apertures for receiving large sample containers. On the other hand, smaller volume rotors may be designed for operation at speeds as high as 25,000 rpm and can generate centrifugal forces close to $10^5$G. The large forces in both the large and small volume rotors subject their drive systems to structural stress and fatigue which can result in structural failure.

Two types of failure can occur: a load failure, which is caused by excessive centrifugal force on the rotor, and drive system failure, which is largely due to varying degrees of load imbalance. While rotors are designed and tested to operate at their rated top speed without structural failure, load failure is likely to occur if the devices are operated at speeds higher than their rated speeds. Therefore, prevention of accidental operation at unsafe speeds is essential in designing and operating a safe centrifuge. Furthermore, although centrifuges are designed to operate with balanced loads, an uneven sample placement, imperfect motor-rotor combinations, or degradation in the drive system due to prolonged operation can result in varying degrees of load imbalance, and continual operation under unbalanced conditions can cause permanent damage to the drive system bearings and, in the worst case, a catastrophic destruction of the instrument.

Accordingly the design objectives for providing a safe centrifuge system include the prevention of accidental operation at unsafe speeds and the early detection of unbalanced conditions. Thus, a reliable rotor identification system for preventing accidental unsafe operation of the load and a detector system for safely shutting down the system upon detection of an unbalanced condition are essential in the design of a safe centrifuge.

Not only should a centrifuge meet the safey requirements described above, but to be commercially viable it must also be cost effective. One commercially available solution to the problem of identification utilizes an identifying pattern of magnets in the centrifuge rotor. During initial stages of a run, the pattern is read by a Hall effect sensor and the sensor output is decoded by a controller for identification. Once the rotor is identified, the controller automatically sets safe operating ranges for the device and prevents the user from operating it outside this range. Although this is a highly reliable solution, it is not easy to manufacture, for any new rotor design must be accurately coded with unique magnet patterns and the controller in every centrifuge which uses the rotor must be programmed to accept and decode the new pattern. Thus, this procedure ultimately adds cost to the individual rotors and to instrument maintenance during new design introduction.

Another rotor identification system measures both inertia and windage to provide a "signature" which uniquely identifies the rotor. Although this method is cost effective, reliable inertia and windage computation requires minimal variations in motor torque and in the operating environment. In practice, there are noticeable variations in the instrument due to changes in operating conditions, so that the method is not fully reliable and requires periodic calibration. Another technique utilizes a radio frequency transmitter in the rotor cap for identification purposes. This is expensive, however, and the RF signal is subject to interference from noise due to low signal levels and highly noisy environments. Still other systems utilize ultrasound imaging for rotor identification, but these are prohibitively expensive and are unreliable.

It is, therefore, an object of the present invention to provide an accurate, reliable, cost-effective method and apparatus for determining safe operating conditions for centrifuge rotating components.

It is another object of the invention to provide a method and apparatus for uniquely identifying the rotating components of a centrifuge by their individual responses to rotational forces, then use this information to adjust the instrument control parameters for optimal safe operation.

Still another object of the invention is to provide a method and apparatus for detecting imbalance or excessive rotational energy to determine the unsafe operation of the centrifuge and automatically shut down the system for safety.

A further object of the invention is the provision of a method and apparatus for determining the power spectrum density of rotating components during operation to monitor the vibration characteristics of the drive system to report maintenance conditions to prevent costly damages to the system.

Yet another object of the invention is to provide a method and apparatus to perform failure analysis and other instrument performance analysis during development to determine the boundary conditions for safe operation of an instrument.

A further object of the invention is the provision of a method and apparatus for identification of rotors by determining the power spectrum density of rotating components during operation.

Another object of the invention is to provide a method and apparatus for controlling the operation of a centrifuge by a determination of the power spectrum density of the drive system during operation and by comparing the measured values with known characteristics.

SUMMARY OF THE INVENTION

The present invention is directed to a novel technique and apparatus for identifying centrifuge rotors, for determining the load condition of the rotor, and for controlling the operation of the centrifuge on the basis of such measurements. Through the use of an accelerometer and a signal processing method in which the power spectrum density (PSD) of the drive system's rotational dynamics is determined during operation, the total energy and the peak frequency content of the rotational dynamics of the drive system are determined. The peak frequency content is used to uniquely identify the rotor or rotor type, while the total energy measurement is used to monitor charges in the magnitude of the vibration energy of the rotating components to detect critical performance parameters of the system, such as rotor imbalance or excessive rotational energy. These measurements are then used to regulate the operation of the centrifuge.

A typical centrifuge drive system includes a rotor, a motor and drive shaft for supporting and driving the rotor, and suitable support bearings, these components being supported in a suitable frame and housing, in known manner. These massive components absorb and dissipate energy during rotation, and because of their mass and flexibility they produce, when subjected to internal and external disturbances, a unique pattern of motion which may be referred to as the "response" of the rotating components. The response of the system to rotational forces is related to the design and to the dynamics of the drive system components, and thus is an indication of deflection and stress in the drive system. Typically these rotational dynamics are manifested as vibration. The power spectrum density (PSD) of the vibration of the drive system provides a measure of this unique pattern, or response, of the rotary system, and thus it provides a measure of deflection and stress. Because the response of various types or designs of rotors or rotating systems are unique, the measurement of PSD can be used to identify a particular rotor or drive system in a centrifuge by comparing the measured response of a combination of rotor and the drive system of a centrifuge with a set of reference responses table that is comprised of the predetermined or previously measured response of all valid rotors used with the centrifuge's drive system. A rotor is uniquely identified when the measured response matches that of a particular rotor in the reference response table. The measured response can be obtained while accelerating the rotor from rest to a predetermined speed with the comparison to the predetermined reference patterns being carried out in real time. Once the rotor is identified, the operation parameters of the centrifuge can be set automatically.

In general, a nonrotating system has an undamped natural frequency which can provide a measure of the system's mass and elasticity. Such measures are useful in identifying potential problems which can occur, for example as a result of vibrations at the resonant frequency of such a system. In a rotating system, on the other hand, the natural resonant frequency of the system changes with the rotor speed due to the mass acceleration of the rotor and the gyroscoping effect. In such a rotating system, a condition of resonance may exist if the frequency of any of the harmonic components of the periodic forcing phenomenon are equal to, or approximate, the frequency of any mode of the rotor vibration. If such a resonance occurs at a specific speed, that speed is referred to as the "critical speed" of the rotor.

In a centrifuge drive system, differences in rotor size and shape cause differences in the rotational dynamics of the drive system, and since the critical speed, and thus the resonant frequency, of a rotor is a function of the dynamics of rotation, it is unique to the rotor family. It is this unique pattern, or response, which can be used to positively identify a rotor from a set of rotors used with a particular centrifuge. By accurately measuring the critical speed during acceleration in such a system, the rotor can be uniquely identified by comparing its characteristics with previously-measured or calculated characteristics of known rotors or drive systems. In accordance with the present invention, the ciritical speed is determined from a measurement of the power spectrum density of the drive system's rotational dynamics during a run.

In an ideal environment, where the rotor load is perfectly balanced, the rotational axis is at the center of the rotor mass. In this case, the rotating mass experiences minimum gyration, and therefore its rotation is free of any significant vibrations or "wobbles". In such a case, the critical speed of the rotating system may be significantly different than the critical speed of an unbalanced system, for where there is any imbalance in the rotating mass, the center of axis of rotation is not necessarily the center of the load, causing the load to rotate in an elliptical pattern to produce a "wobble" effect and significant vibration. Although a rotating system typically would be manufactured with precise tolerance and ideal dynamic characteristics, the load condition can vary widely, not only because of manufacturing standards and the design of the system, but because of user's imperfection in sample placement. Furthermore, when the motor and the load are integrated as a system, the interaction between the components of the system introduces new dynamic considerations, and all of these factors impact on the amount of wobble or vibration occuring during acceleration of the rotating system. This in turn, impacts the frequency at which the resonance occurs and the amplitude of the resulting resonant vibrations. If an unbalanced load is allowed to rotate at the critical speed, the system may resonate to self destruction, and accordingly an understanding of the exact nature of the critical speed of any rotor drive system not only uniquely identifies the rotor, as noted above but is necessary for safety.

In accordance with the present invention, therefore, the power spectrum density (PSD) characteristics of a new rotor design or a new drive system are monitored during acceleration of the system from rest to measure the vibration energy and the frequency spectrum of that vibration. The speed at which the measured vibration energy reaches a maximum is considered to be the critical speed, while the frequency spectrum of that vibration reveals the nature of the mechanical motion occurring during rotation. A set of response parameters is derived from the measured PSD characteristics which, because of the physical differences between them, represent the unique dynamic properties of the rotor or the type of rotor or the drive system. These response parameters are supplied to centrifuge users for storage in reference tables to be used with such devices.

When a rotor is installed in a centrifuge, its response is monitored during an initial acceleration run, and its measured PSD characteristics are compared against the predetermined or premeasured values stored in the centrifuge memory storage tables to identify the rotor. Once the rotor is identified, the operation of the centrifuge system is controlled for optimal operation for that rotor and to provide safety lockouts which prevent the system from operating beyond the critical speed. The entire identification process is performed in real time using signal processing techniques utilizing a high performance processor and thus is reliable, and highly cost effective.

BRIEF DESCRIPTION OF THE DRAWINGS

The foregoing, and additional objects, features, and advantages of the invention will become apparent to those of skilled in the art from the following detailed description of a preferred embodiment thereof, taken in conjunction with the accompanied drawings, in which.

DETAILED DESCRIPTION OF THE INVENTION

Figure 1:
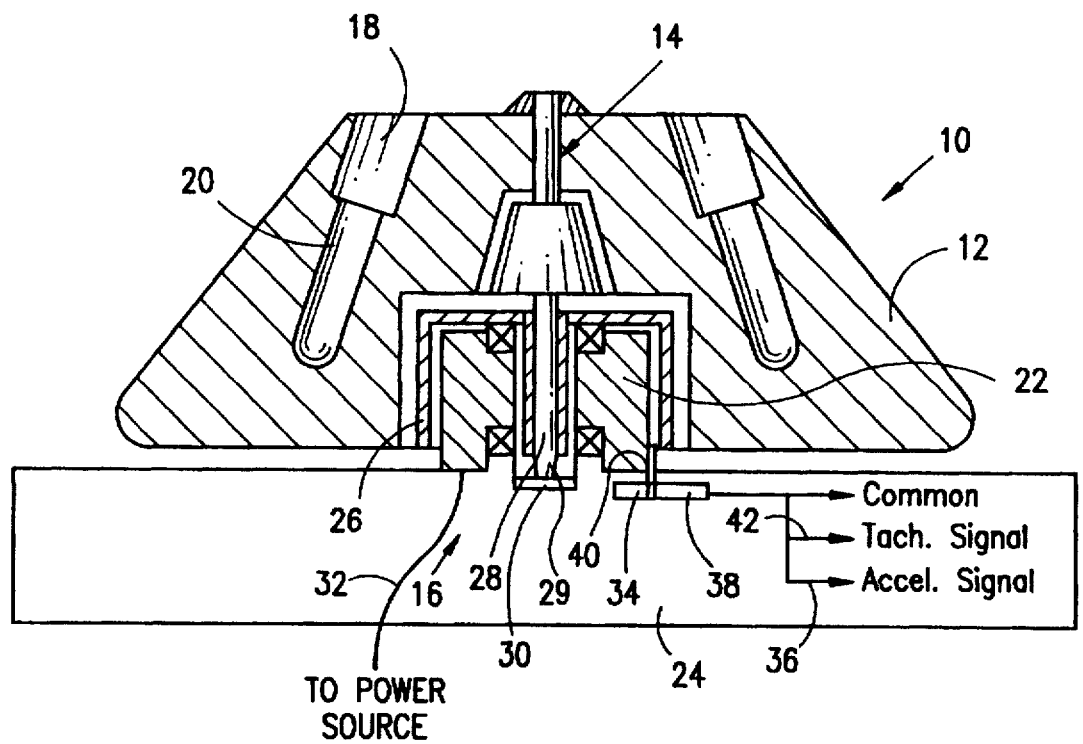
FIG. 1 is a cross-sectional view of a typical centrifuges showing the sensors utilized in the present invention.

Turning now to a more detailed description of the present invention, there is illustrated in FIG. 1 a typical centrifuge 10 which includes a rotor 12 mounted on a shaft 14 which is driven by an electric motor generally indicated at 16. The rotor, shaft and motor constitute the drive system for the centrifuge 10, and operate in known manner. The centrifuge rotor 12 may include a plurality of chambers 18 for receiving samples 20 of material which is to be separated by the centrifuge, with the rotor and samples being referred to as the centrifuge load. Although only two chambers and samples are illustrated in this figure, it will be understood that a plurality of such chambers may be provided in the rotor, preferably equally spaced around the central shaft 14.

The motor 16 includes a fixed stator 22 which may be mounted, for example, on a suitable base 24, with a cup-shaped rotor 26 surrounding the stator and receiving the lower end 28 of shaft 14. The lowermost end 29 of the shaft may engage a thrust bearing 30 mounted in the base 24 to provide free rotation of the centrifuge rotor 12 upon energization of motor 16 from a suitable electrical power source connected to the stator by way of power line 32.

Mounted on the stator 22 is a sensor 34, which preferably is an accelerometer, to detect vibratory motion of the drive motor and thus of the entire drive system. The sensor is a standard motion detector and provides an output signal on line 36 which represents the detected mechanical motion of the drive system. A tachometer 38 is also mounted on the base 24 and includes a probe 40 for sensing the rate of rotation of the motor rotor 26. The tachometer provides on output line 42 a signal which represents the rate of rotation of the motor rotor 22, the shaft 14 and the centrifuge rotor 12.

Figure 2:
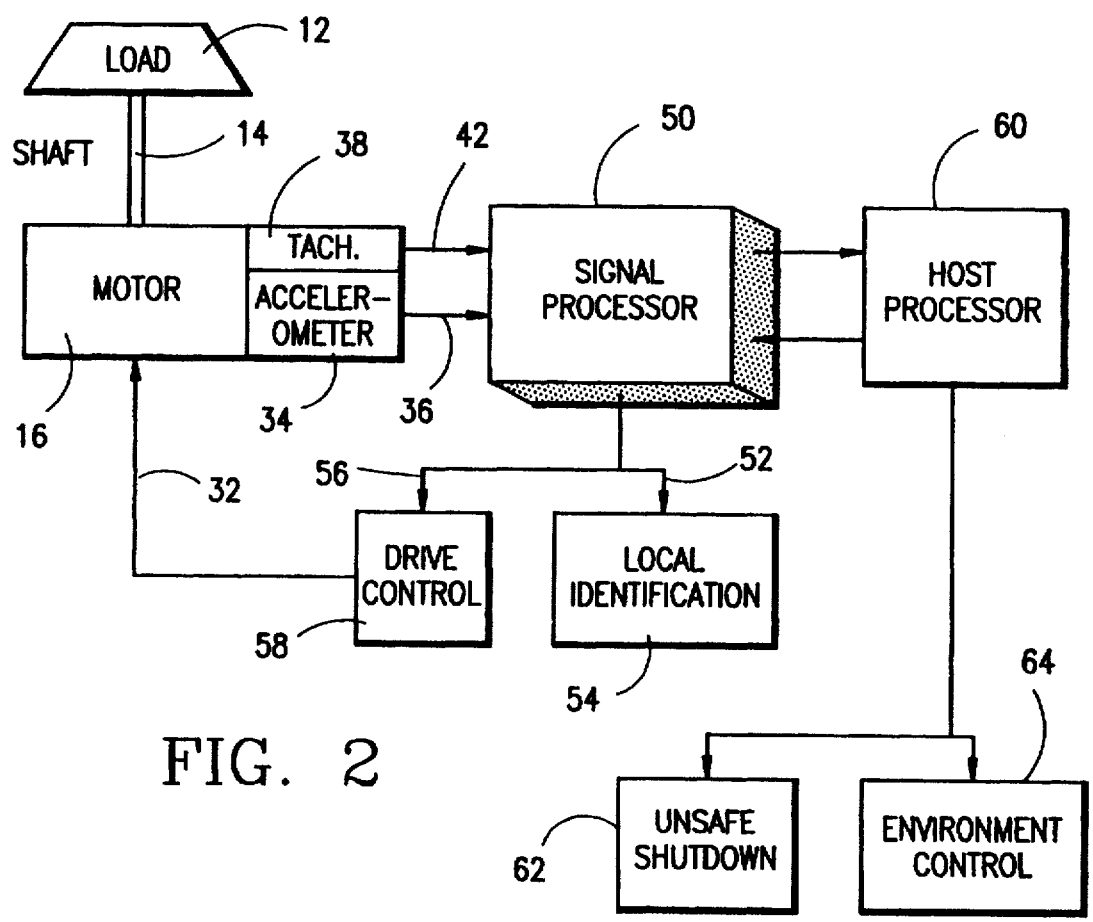
FIG. 2 is a block diagram of the system of the present invention.

The output signals on lines 36 and 42 are supplied to a signal processor 50 (FIG. 2) which accepts the sensor data and formats it for the processing required to obtain a power spectrum density signal. The signal processor is a high speed, high performance, low cost processor such as a conventional microprocessor capable of receiving and processing digital signals. As illustrated in FIG. 2, the signal processor 50 produces an output signal on line 52 for identifying the rotor 12 of the centrifuge, as illustrated at block 54, and produces an output on line 56 which may be used for controlling the drive motor 16, as by shutting down the power to the motor if an alarm condition is detected, as indicated at block 58.

As illustrated in FIG. 2, the microprocessor 50 may be operated under the control of a host computer 60 which is programmed to cause the signal processor to execute the desired operation of the system in accordance with user settings and controls, and to provide at blocks 62 and 64 alarm signals in the event of a shut down due to unsafe operating conditions of the temperature or other environmental conditions in which the centrifuge operates are not within desired tolerances.

As indicated above, the sensor may be any commercially available accelerometer for detecting vibration, and is positioned in the drive system for maxim detection of the motion of the system during operation. The output of the accelerometer is a voltage or current which is proportional to the magnitude of the vibration, and this output signal is routed to the appropriate data acquisition hardware in the processor 50. Although there are a variety of accelerometer technologies available, two types are most common: piezoelectric sensors and silicon sensors. Although piezoelectric sensors offer greater dynamic range and sensitivity, silicon based accelerometers are more economical and are adequate for centrifuge applications. A commercially available accelerometer that is suitable for the present system is the model ADXL05 available from Analog Devices, Inc.

Figure 3:
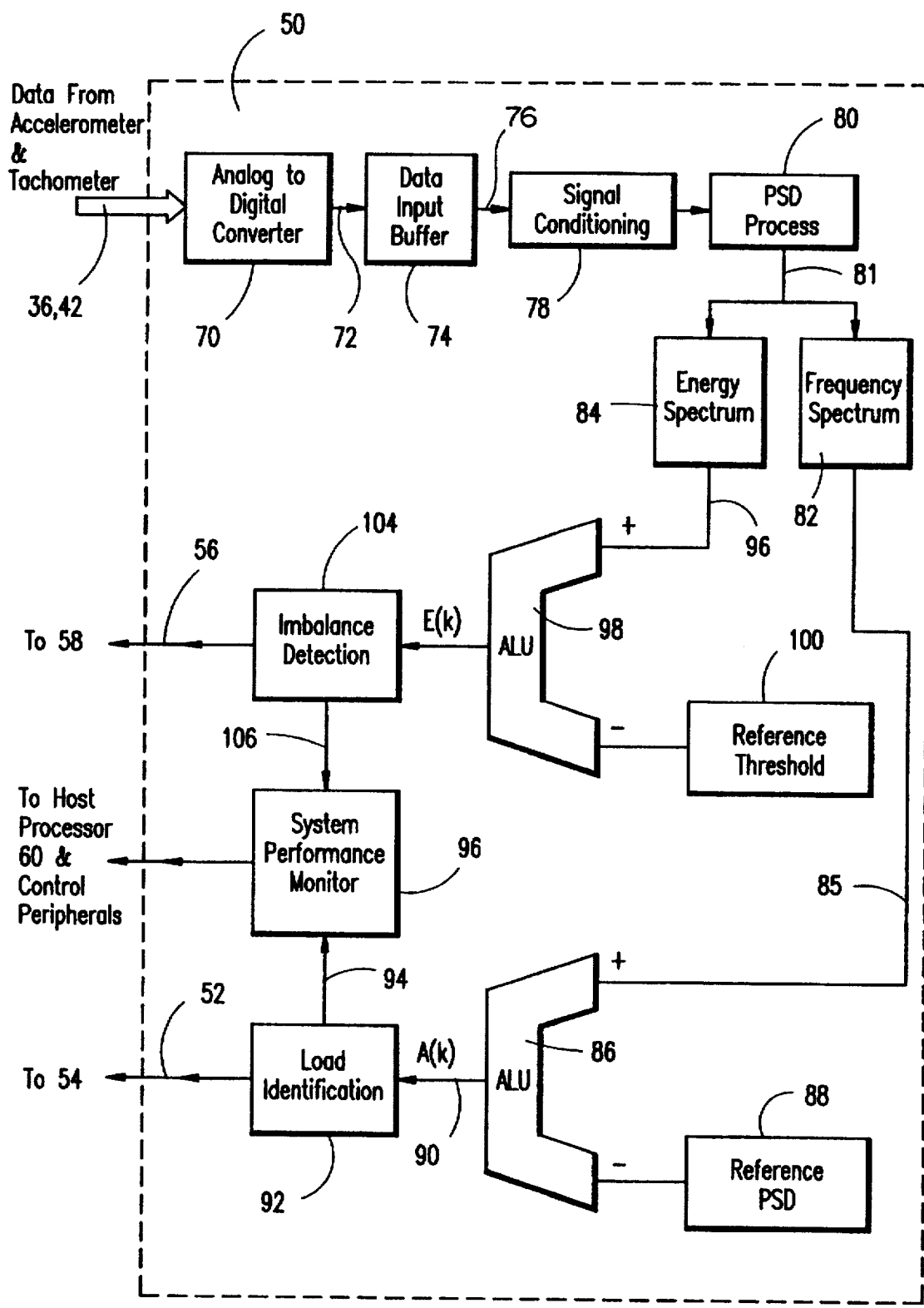
FIG. 3 is a block diagram of the signal processor of FIG. 2.

The processor 50 is illustrated in greater detail in FIG. 3, to which reference is now made. The key characteristics of a rotating drive system are derived from the real time vibration data obtained by the accelerometer 34 and the relationship of that data to the speed of rotation, obtained by the tachometer 38. Because of this relationship between the vibration data and the speed of rotation of the drive system, the data from both must be acquired synchronously, as the rotating drive system is accelerating from a rest position toward its final speed. A preferred form of the data acquisition system includes an analog to digital converter 70, the output of which is supplied by way of line 72 to a data input buffer 74 where the collected data is temporarily stored.

In order to increase the efficiency of the processor, the data may then be supplied by way of line 76 to a signal conditioning circuit 78, which provides a pre-processing operation such as filtering or windowing. The data is then supplied to a power spectrum density, or PSD, processor 80 which converts the time domain data to a frequency power spectrum. The output from the PSD processor 80 is then supplied by way of line 81 to a frequency spectrum analyzer 82 to determine frequency peaks, and is supplied to an energy spectrum analyzer 84 to determine total energy in the accelerometer data signal.

The frequency spectrum signal from analyzer 82 is supplied by way of line 85 to a comparator 86 where it is compared to a reference table of predetermined frequency values for rotor identification. These predetermined values may be obtained from tests of specific rotors or rotor types, as discussed above, or can be obtained from calculations based on the design and construction of the drive system. This table of predetermined values is matched against the output of the frequency spectrum analyzer 82 to produce an output signal on line 90 which represents the degree of match between the sampled data and the referenced data. When the value of the signal on line 90 is a minimum, a positive identification of a particular rotor or rotor type is indicated by the load identification circuit 92 which produces an output signal on line 52. This same indication can also be provided by way of line 94 and a system performance monitoring circuit 96 to the host processor 60 for use in controlling the centrifuge.

Similarly, the output of the energy spectrum analyzer 84 is supplied by way of line 97 to a comparator 98 for comparison with a predetermined vibration threshold stored at 100 to determine whether the total energy of the measured vibration exceeds a predetermined safe value. As indicated above, this safe value is a function of the critical speed of the particular rotor or type of rotor, and an output signal is provided on line 102 to the imbalance detector circuit 104 when the threshold is exceeded. The circuit 104 provides an output an line 56, for example to shut down the drive motor when the threshold is exceeded, and also provides an output on line 106 for delivery through the system performance monitor 96 to the host processor.

The PSD processor 80 performs a spectral analysis of the data signals received from the accelerometer 36. This spectral analysis is a well understood signal processing method that characterizes the frequency contents of the data and, in the preferred form of the invention, utilizes a Fourier transform for relating the input signal to its frequency-domain representation. A continuous time Fourier transformed is represented in the following expression:

$$H(f) = \int_{-\infty}^{+\infty} h(t)\exp(-j2\pi ft)dt \quad \text{(Equation 1)}$$

The total energy tin the continuous time series is $$E = \int_{-\infty}^{+\infty} |h(t)|^2 dt = \int_{-\infty}^{+\infty} |H(f)|^2 df \quad \text{(Equation 2)}$$

In a digital system, the data is sample in time and the discrete Fourier Transform is applied to produce the spectrum information in discrete intervals in frequency:

$$X[k] = \sum_{n=0}^{N-1} x[n]\exp(-j2\pi kn/N) \quad \text{(Equation 3)}$$

Power Spectral density is a statistical extension of the energy spectral density, and is defined as the discrete-time Fourier transform of the autocorrelation sequence:

$$Pxx(f) = T \sum_{-\infty}^{\infty} r_{xx}[m]\exp(-j2\pi fmT) \quad \text{(Equation 4)}$$

The autocorrelation is defined in the following equation:

$$r_{xx}(m) = E\{x(n+m)x^*(n)\} = \quad \text{(Equation 5)}$$

$$\lim_{M \to \infty} \frac{1}{2M+1} \sum_{n=-M}^{M} x[n+m]x^*[n]$$

where E is the expectation, or mean value of an ergodic process x(n) at a time index n. In practice, the autocorrelation is estimated with the available finite data record. Assuming N data samples x(n) indexed from n=0 to n=N-1, the discrete time autocorrelation estimate is:

$$\hat{r}_{xx}[m] = \frac{1}{(N-m)T} \sum_{n=0}^{N-m-1} x[n+m]x^*[n]T = \quad \text{(Equation 6)}$$

$$\frac{1}{N-m} \sum_{n=0}^{N-m-1} x[n+m]x^*[n]$$

The autocorrelation at m=0 represents the average power in the random process.

In the vibration analysis of the present invention utilizing an accelerometer, the voltage output of the accelerometer is sampled and is used to compute the total energy and frequency content. The foregoing equations represent the fundamentals of spectral analysis, and the resulting PSD value can be used to characterize the centrifuge operation and to provide the outputs required to improve its overall performance economically.

The PSD processor 80 operates in the manner illustrated by the flow diagrams of FIGS. 4, 5, 6, 7 (A) and 7 (B) to which reference is now made, to obtain the PSD characteristics of the system during normal operation. A normal operating load is defined as any motor/centrifuge rotor combination which does not exceed the imbalance tolerance given in the product specification. The process involves a real time, on-line computation and storage of the power spectrum density, and off-line analysis for identification of PSD frequency spectrum peaks and identification of the critical speed. The process is performed with each and every class of rotor or load condition which the system will need to identify uniquely in order to establish a reference table for storage in the reference location 88 of FIG. 3. Once the reference spectrum table is obtained for a perfectly balanced load and for a worst case unbalanced condition, this table is used to identify a particular load during operation. During a normal run, key identifying characteristics of the PSD, such as frequency peaks and critical speed of any load are compared against the reference table, and the values in the reference table which produce the best fit are used to identify the rotor.

Real time detection of unbalanced conditions of the load is essential for the safe operation of the centrifuge. The most damaging effects of an imbalance occurs during critical speed, so in order to operate the device safely at the critical speed, the vibration energy due to any imbalance in the system should be less than a predetermined safety limit. By using the accelerometer 34 to measure the vibration energy and the tachometer 38 to measure rotational speed, and by comparing the vibrational energy against a predetermined reference threshold stored at 98 in FIG. 3, the rotating load can be monitored continuously for unsafe conditions.

Figure 4:
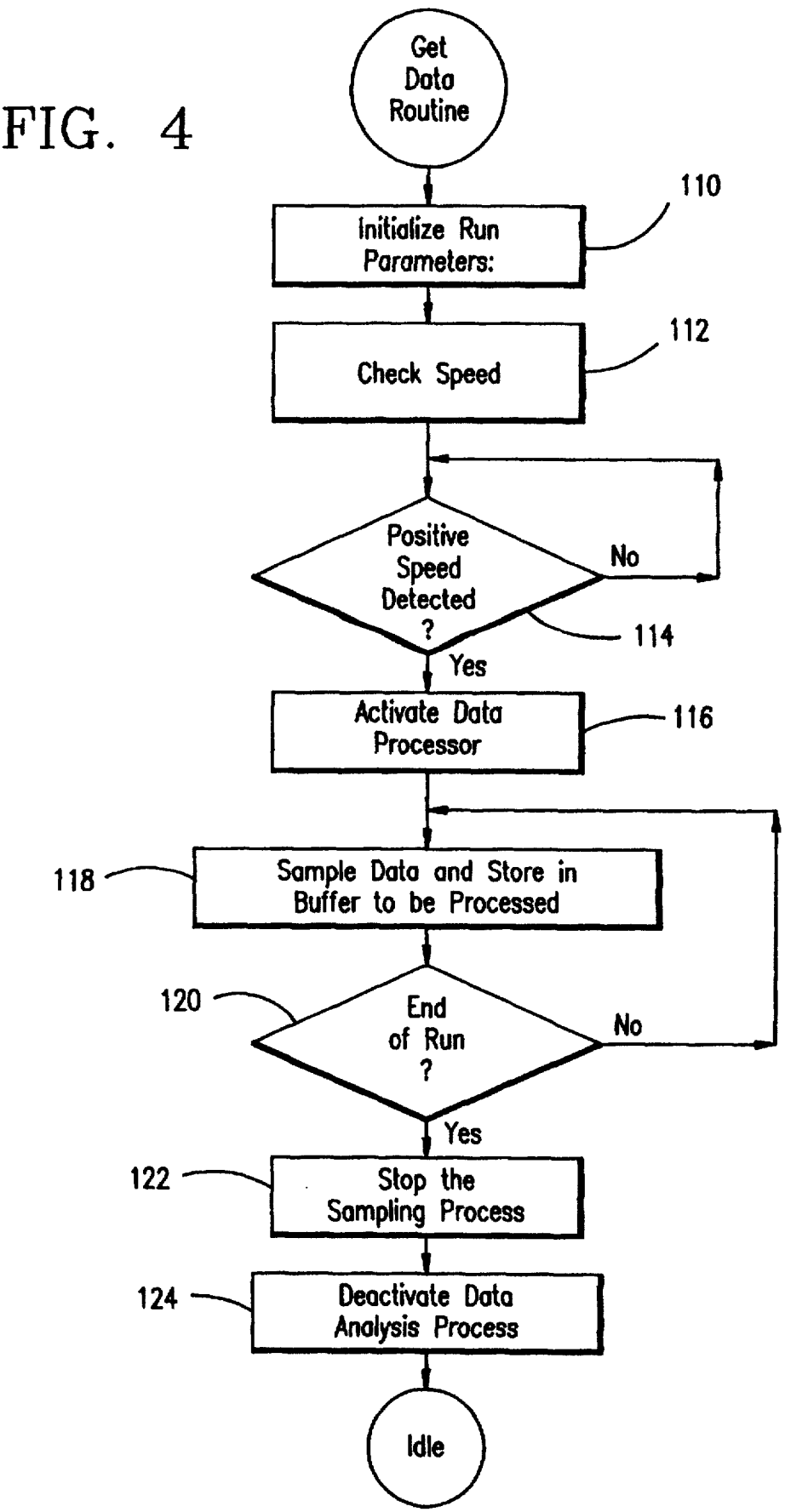
FIG. 4 is a flow diagram illustrating the data acquisition steps utilized in the system of the present invention.

A data acquisition procedure for the monitoring process is illustrated in FIG. 4 where, under the control of the host processors, the system is initialized, as indicated at box 110, and the rotational speed from the tachometer output is measured. If a positive speed value is detected, at 114, indicating that the system is operational, the signal processor 50 is activated by the host computer, as indicated at 116. Data from the accelerometer 34 is received by processor 50 by way of line 36, is converted to a digital form, is temporarily stored in a buffer, and is then conditioned and sampled for supply to the PSD processor 80 as indicated in box 118. At the end of the run being measured, which may be determined by the user of the system or may be determined in response to system conditions such as an unbalance condition, indicated at box 120, the sampling process is terminated, as indicated at box 122 and the host computer deactivates the data acquisition process, as indicated at 124.

Figure 5:
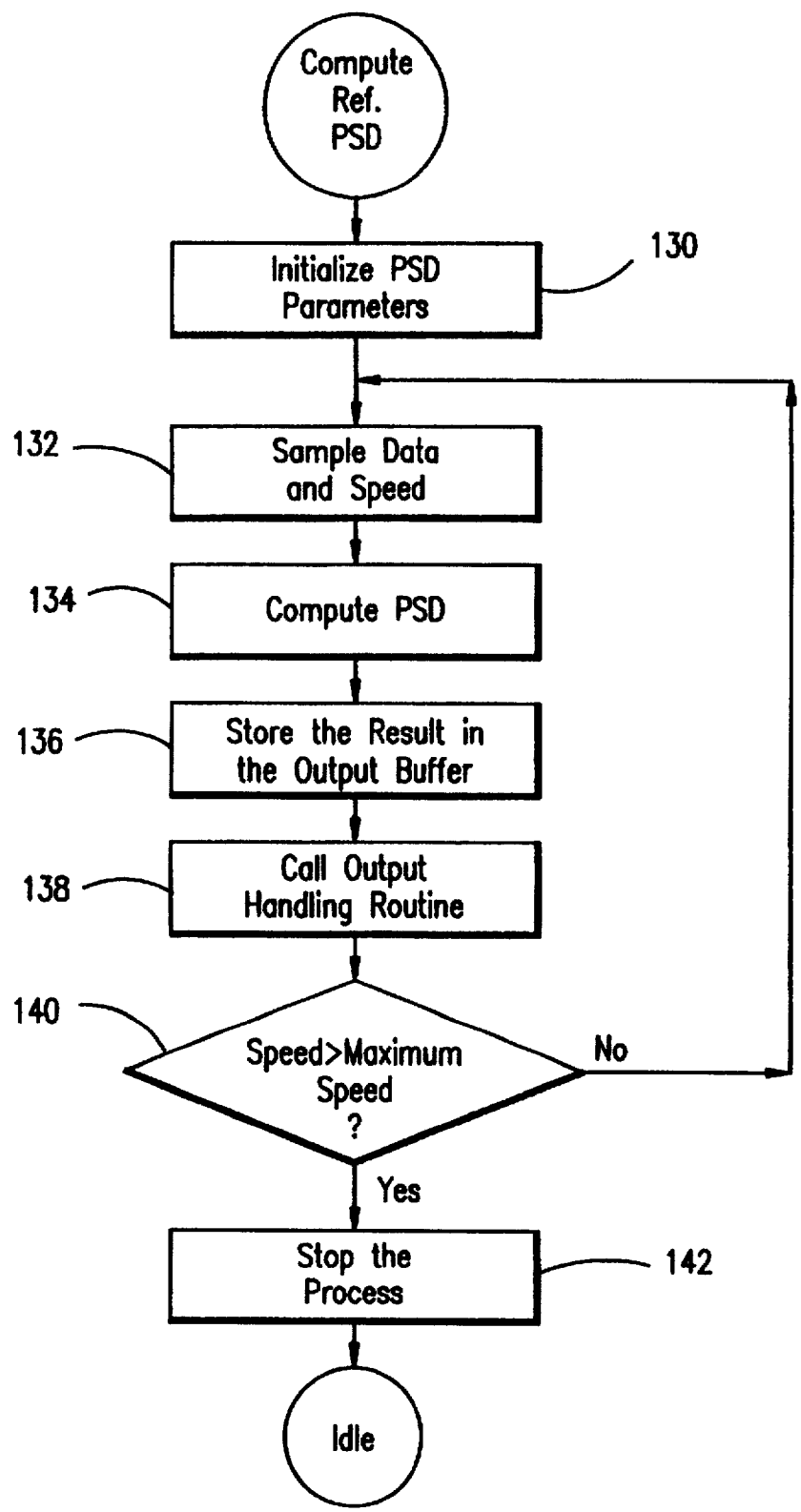
FIG. 5 is a flow diagram illustrating the computation of the power spectrum density of the rotating system of FIG. 1.

As illustrated in FIG. 5, the PSD processor, after initialization indicated at 130, samples the data stored in step 118 of FIG. 4 as indicated at 132 and computers the power system density, as indicated at 134, utilizing the formulas described above in equations 1–6. The completed computations are stored in a PSD output buffer, as indicated at 136 and, as indicated at 138 and 140, a determination is made as to whether the rotor has reached its maximum speed. If not, the sampling process continues until the maximum speed is reached, at which time the process is stopped, as indicated at 142.

Figure 6:
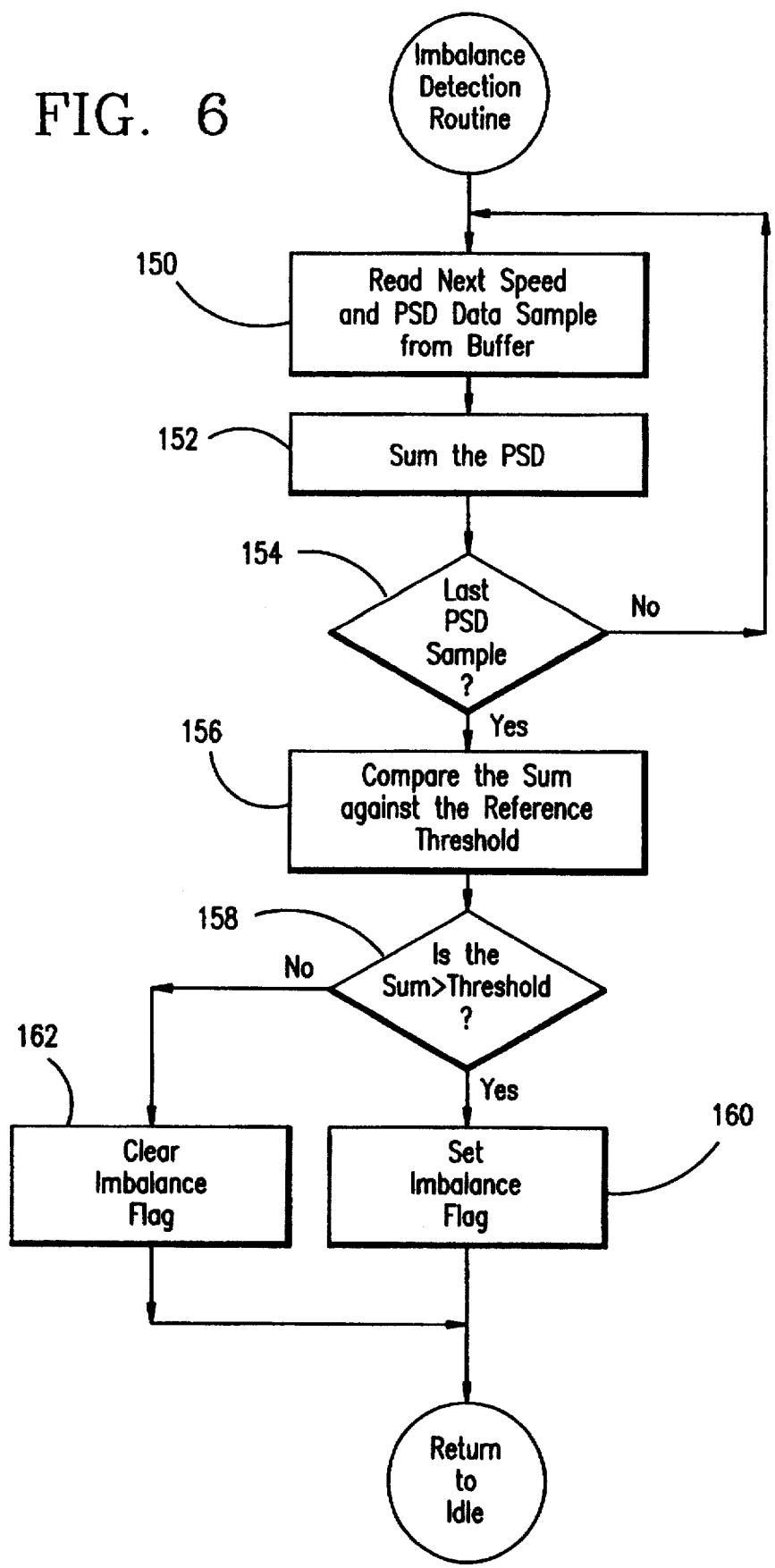
FIG. 6 is a flow diagram of the steps for determining imbalance in the rotating system of FIG. 1.

The determination of an unbalanced condition is carried out in accordance with the process of FIG. 6, wherein the speed and a PSD data sample from the PSD output buffer, described above at 136, is obtained, as indicated at 50. The PSD values are summed at 152 and if additional data samples are available, the process is repeated as indicated at 154. If all of the samples have been read, the resulting sum is compared to the reference threshold in comparator 98, as indicated at 156. If the sum as shown at 158 exceeds the threshold value, an alarm condition is indicated at 160. If the sum is less than the threshold, the alarm condition is cleared, as indicated at 162.

Figure 7A:
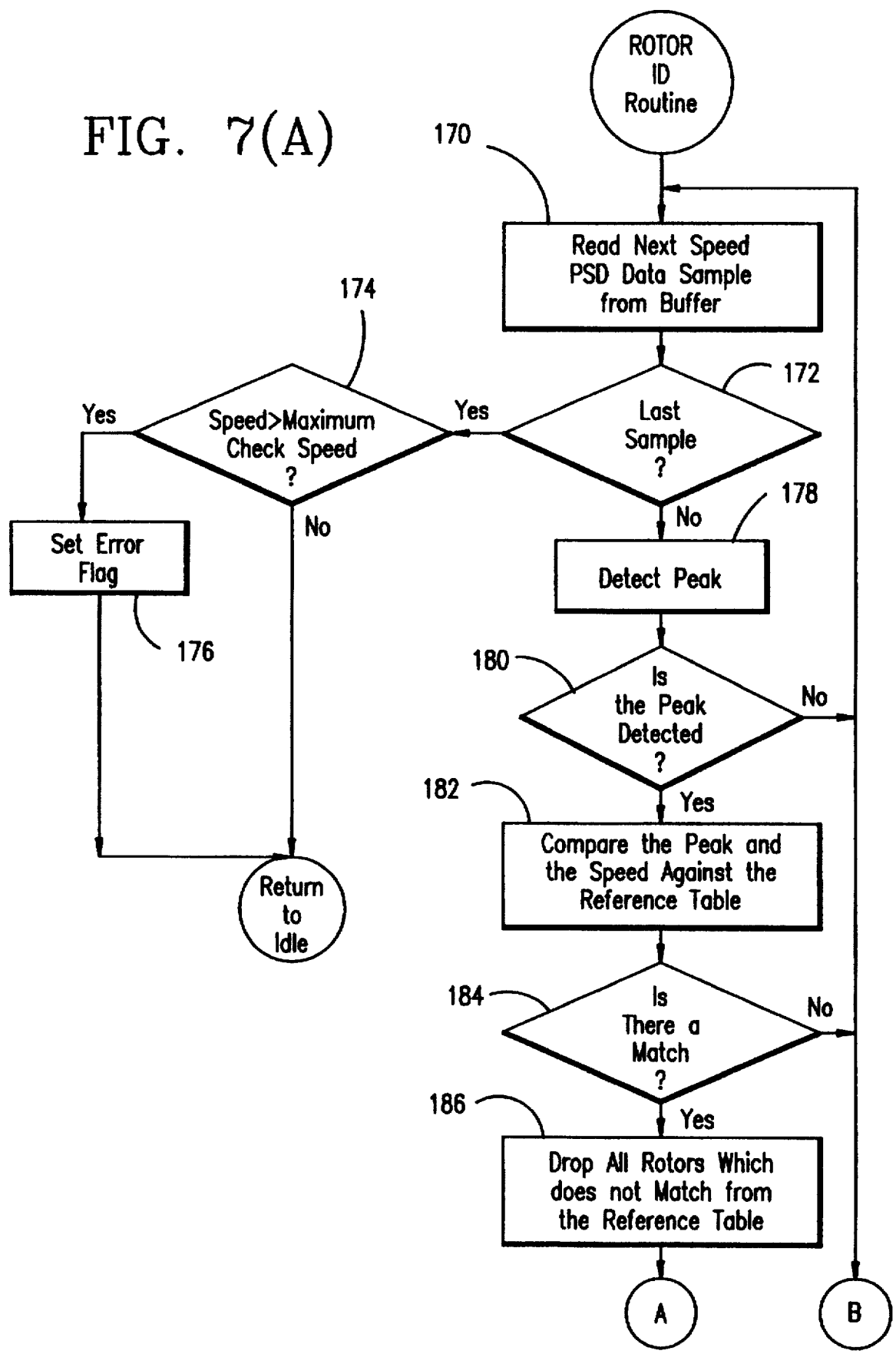
FIGS. 7(A) and 7(B) illustrate the flow diagram for rotor identification.
Figure 7B:
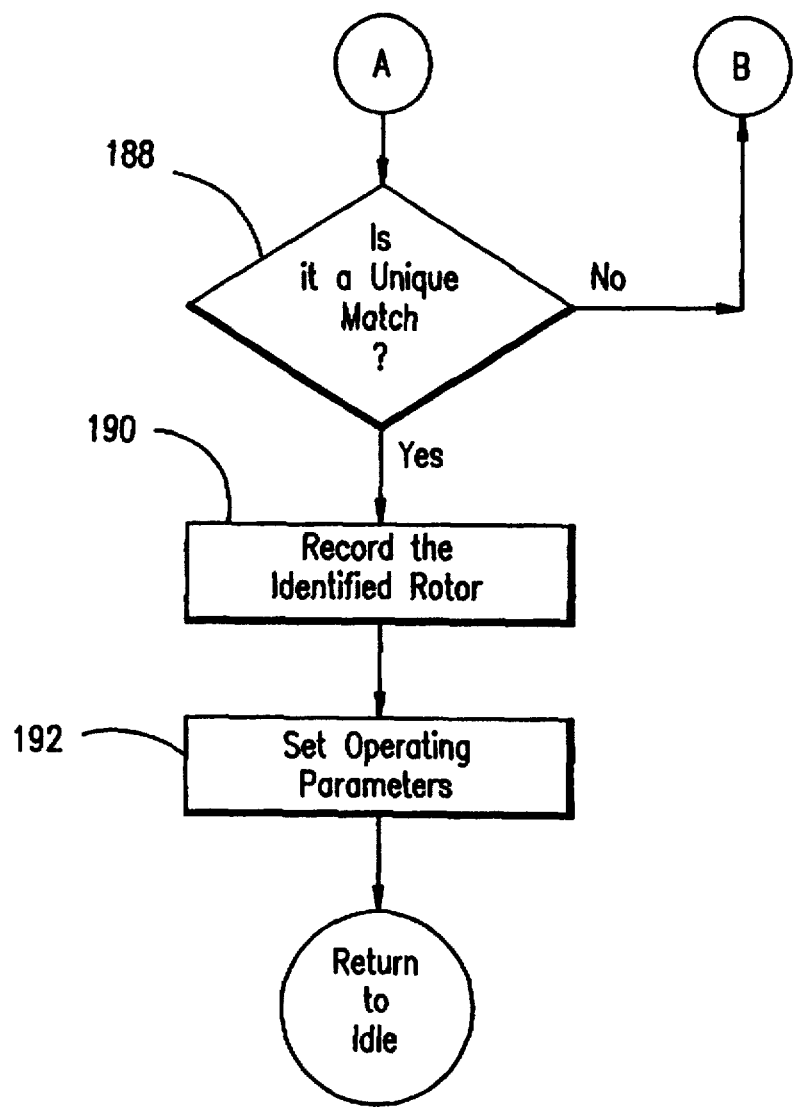

The process for identifying the rotor is illustrated in FIGS. 7(A) and 7(B), wherein the speed and PSD data output samples stored at 136, described above, are sampled as indicated at box 170, and a determination is made as to whether additional samples have been stored, as indicated at 172. If additional samples are not available, a determination is made as to whether the speed exceeds the maximum value, as indicated at 174. If so, an error flag is set at 176, and the system stops.

If the determination at 172 indicates that there are additional samples the frequency spectrum is measured to detect a peak value, as indicated at 178 and the PSD data samples are continuously read until such a peak is detected, as indicated at 180. Once a peak is obtained, that value and the speed of rotation from the tachometer are compared to the values stored in reference table 88, as indicated at 182 and if there is no match, the process is repeated, as indicated at 184. If there is a match with a stored value then any rotors which did not find a match are removed from consideration, as indicated at 186. Thereafter, a determination is made by the load identification circuit 92 as to whether the match is unique, as indicated at 188 and if not, the process is repeated. If there is a unique match, then the rotor is identified, as indicated at 190.

As described, the signal processor initiates the process during the start up, and the power spectrum from the accelerometer output signal is computed. Rotors with different dynamic properties produce spectrums which uniquely identify the rotor type so that the measured spectrum can be compared against a table of reference rotors for positive identification, allowing the centrifuge operating controls to be set as indicated at 192 to permit safe operation.

Figure 8:
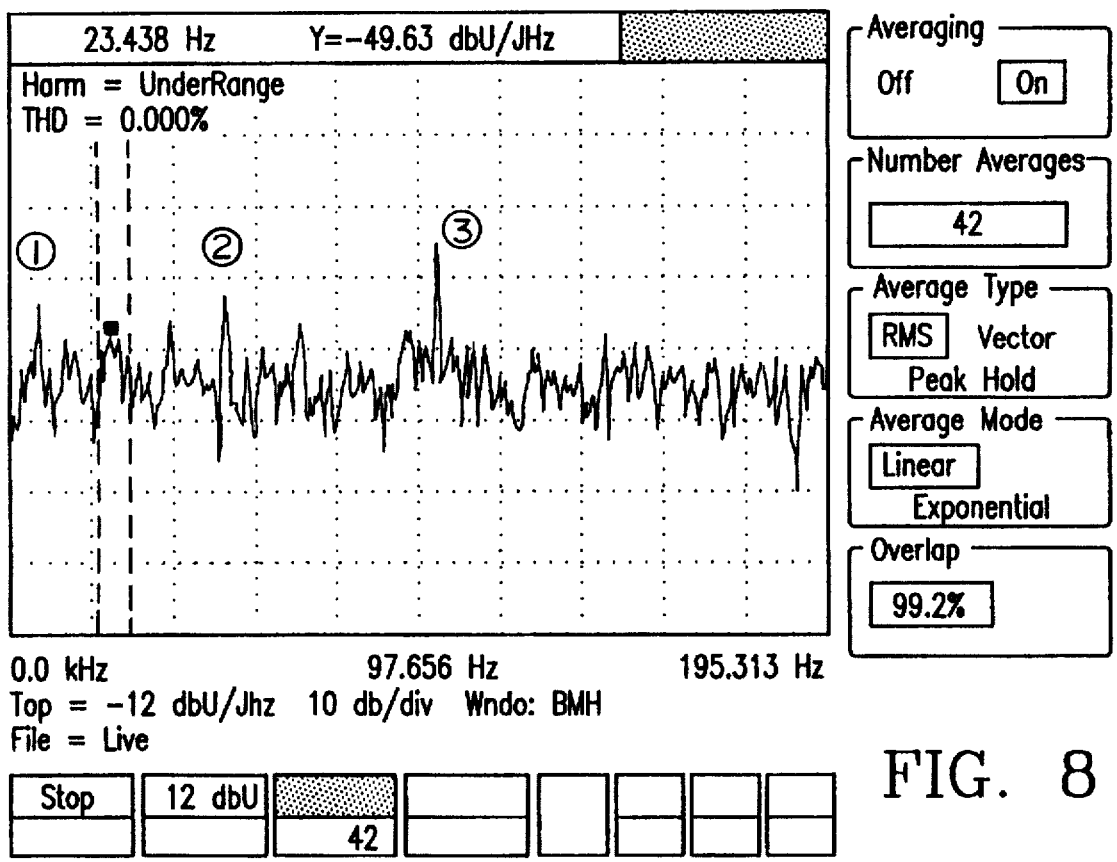
FIG. 8 is a graph representing a sample power spectrum density obtained from a typical drive system for a small rotor designed to operate at high speed.
Figure 9:
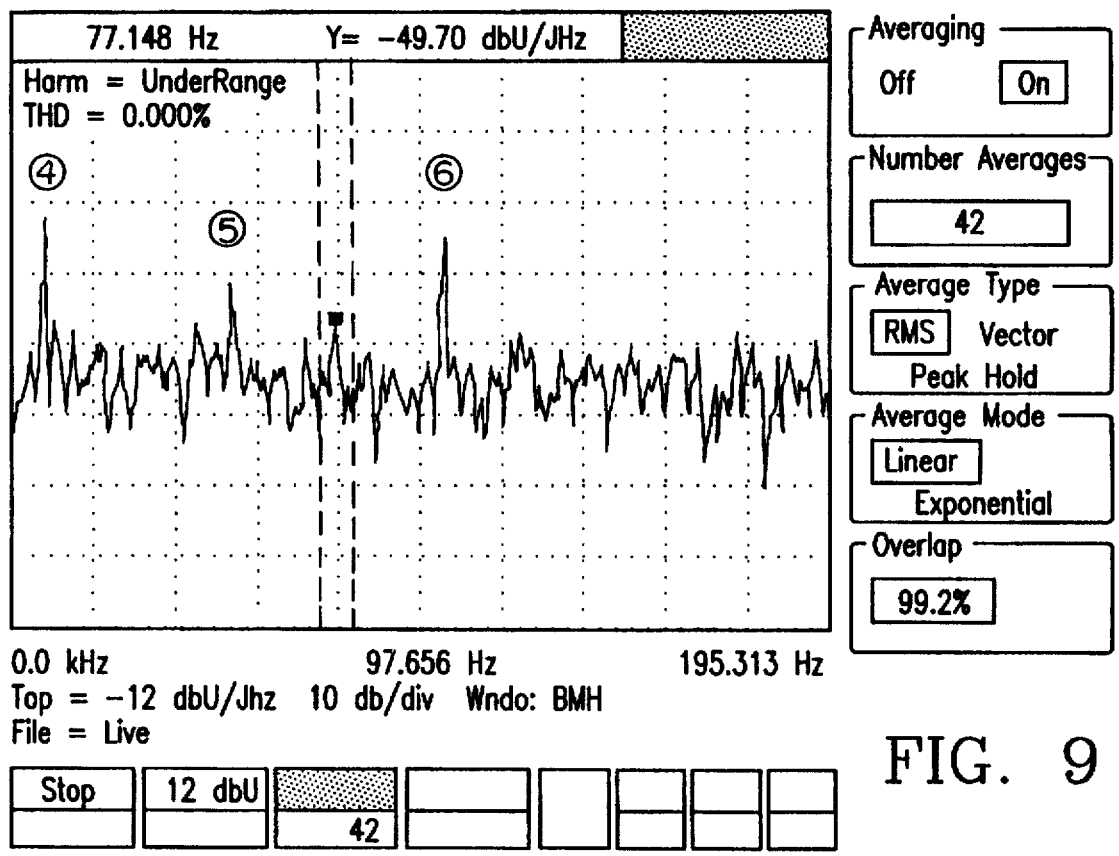
FIG. 9 is a graph representing a sample power spectrum density obtained from a typical drive system for a large rotor used for high volume and operating under the same operating conditions as the rotor represented in FIG. 8.
Figure 10:
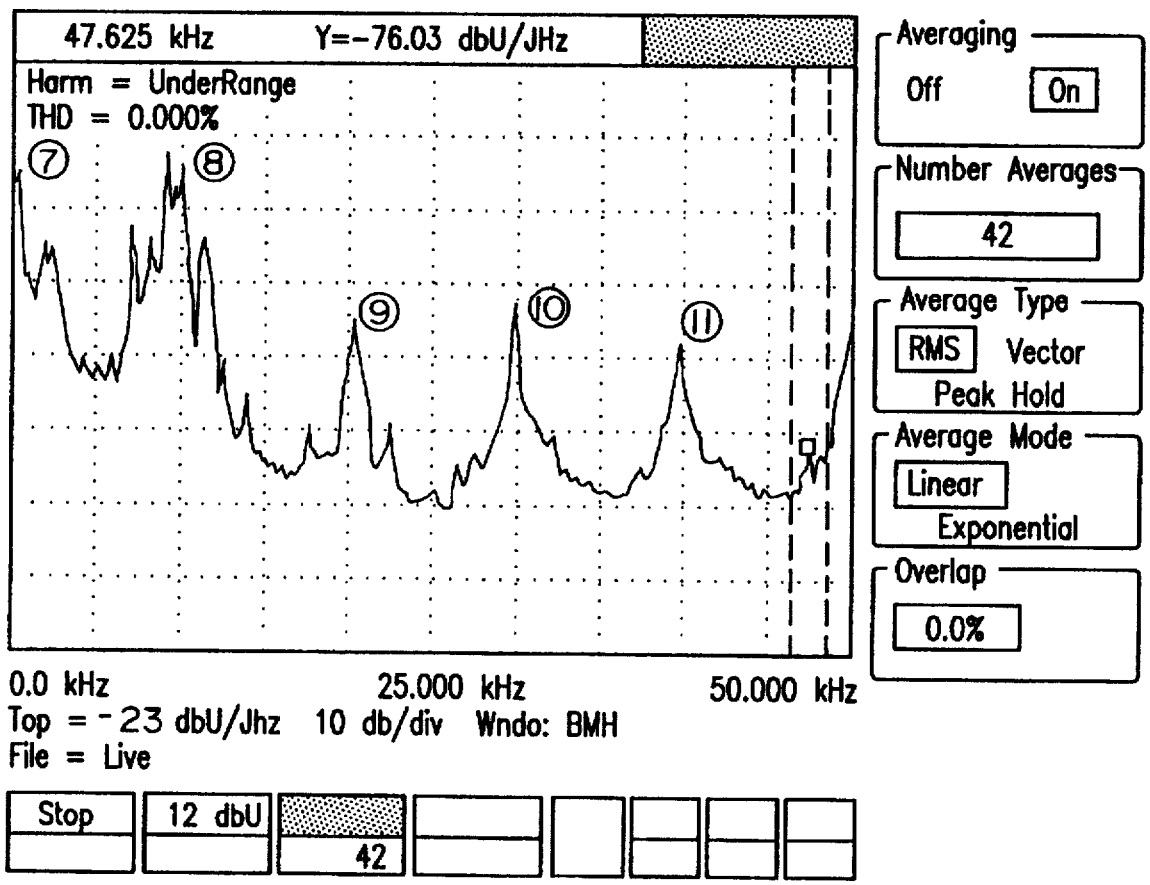
FIG. 10 is a graph representing a sample power spectrum density obtained from a typical drive system for a relatively small rotor as represented in FIG. 8, but operating at more than twice the operating RPM of the rotor represented by FIG. 8.

With reference to FIGS. 8, 9 and 10, in FIG. 8, the speed of operation when the measurement was made was 380 RPM, the peaks are identified as 1, 2 and 3 with corresponding amplitude. FIG. 9 represents the spectrum of a large rotor under the same operating conditions as the rotor of FIG. 1. Although the peaks 4, 5 and 6 are present at roughly the same frequency there is a significant difference in the amplitude pattern, as seen in the graph. FIG. 10 is representative of a smaller rotor, such as the one used to generate the graph for FIG. 1, but operating at more than twice the speed specifically, 920 RPM. The spectra pattern is significantly different from the measurement made at the lower speed. Additionally, it should be noted that the measurement was made at one of the critical speeds of the rotor. As seen in the graph, the total energy is significantly larger than the ones from the other speeds. The key features in the spectrum of the different rotors are pre-determined with commercially available Spectrum Analyzer to formulate the reference table. By comparing the measured data of a rotor during a run to the reference table, the rotor can be uniquely identified.

During a typical run, the host computer monitors and controls the environment in which the centrifuge operates to ensure optimal results. Thus, for example, the processor may control chamber temperature, vacuum, maximum allowable speed, acceleration and deceleration rates, power to the centrifuge and the like. Once the rotor is identified for the identification process, the host computer establishes the set of optimal control parameters from a preprogrammed set of parameters to control the run for that rotor. During each centrifuge run, the vibration characteristics and critical speed of the drive system are monitored and evaluated so that any significant deviation from operation, as established by the reference thresholds and values, indicating degradation of the system, will generate an alarm condition.

Although the present invention has been described in terms of a preferred embodiment, it will be understood that variations and modification may be made without departing from the true spirit and scope thereof, as set out in the following claims.

What is claimed is:

1. An identification system, comprising:
   a) a rotary drive system including a rotor and a drive motor operatively connected to rotatably drive said rotor;
   b) a vibration sensor located to detect vibration in said drive system during operation of said motor to accelerate said rotor from a rest condition to a selected final speed of rotation and to produce a corresponding drive system vibration data signal;
   c) a speed sensor for producing a speed data signal corresponding to the rate of rotation of said rotor;
   d) a processor responsive to said vibration data signal to produce a corresponding power spectrum density signal;
   e) means for deriving from said power spectrum density signal the frequency spectrum of said drive system data signal; and
   f) a comparator for comparing said derived frequency spectrum with the frequency spectra of known drive systems to identify said first-named drive system.

2. The system of claim 1, further including:
   a) means for deriving from said power spectrum density signal the total energy spectrum of said drive system data signal; and
   b) a second comparator for comparing said total energy spectrum to a vibration threshold value to detect excessive vibration in said drive system.

3. The system of claim 2, wherein said speed sensor is connected to produce said speed data signal in synchronism with said vibration data signal.

4. The system of claim 3, wherein said drive system vibration data signal is digitized for input to said processor.

5. The system of claim 3, wherein said drive system vibration data signal corresponds to the magnitude and pattern of vibration of said drive system.

6. The system of claim 3, wherein said total energy spectrum corresponds to the sum of the vibrational energy measured by said vibration sensor during acceleration of said rotor.

7. The system of claim 3, wherein said means for deriving said frequency spectrum includes means for evaluating said power spectrum density signal to determine the frequency of rotation of said rotor at the maximum amplitude of vibration.

8. The system of claim 7, further including means responsive to said second comparator to control the operation of said drive motor.

9. A method for identifying and for detecting imbalance in drive systems embodying rotating bodies, comprising:

a) accelerating a drive system from rest to a predetermined rotational speed;

b) synchronously measuring, during said acceleration, the rate of rotation and the vibrational motion of the drive system to produce a speed signal and a vibration data signal;

c) producing, from said vibration data signal, a power spectrum density signal;

d) deriving from said power spectrum density signal the frequency spectrum of said drive system data signal;

e) comparing said frequency spectrum with frequency spectra of known drive systems to identify said drive system;

f) deriving from said power spectrum density signal the total energy spectrum of said drive system data signal; and g) comparing said total energy spectrum to a vibration threshold to detect excessive vibration in said drive system.

* * * * *